Dec. 23, 1952      A. J. ORTUSI      2,623,207

RADIO OBSTACLE DETECTOR

Filed July 19, 1946      2 SHEETS—SHEET 1

INVENTOR:
ANTOINE JEAN ORTUSI
By John B. Brady
attorney

INVENTOR:
ANTOINE JEAN ORTUSI
By John B. Brady
attorney.

Patented Dec. 23, 1952

2,623,207

UNITED STATES PATENT OFFICE 2,623,207

RADIO OBSTACLE DETECTOR

Antoine Jean Ortusi, Paris, France, assignor to Compagnie Generale De Telegraphie Sans Fil, a corporation of France Application July 19, 1946, Serial No. 684,820
In France February 7, 1945

Section 1, Public Law 690, August 8, 1946
Patent expires February 7, 1965

1 Claim. (Cl. 343—5)

This invention is directed to improvements in or relating to a method of and means for the radio-electric detection of obstacles.

One of the objects of this invention is to provide a compact apparatus for transmission and reception by ultra high frequency waves.

Another object of this invention is to provide a construction of ultra high frequency wave transmission and receiving apparatus employing a single horn supplied by two different wave guides one of which connects to the transmitter and the other of which connects to the receiver.

Still another object of this invention is to provide novel means for associating two wave guides for transmission and reception at ultra high frequencies.

Other and further objects of this invention reside in a novel system of adjustment for associated wave guides as set forth more fully in the specification hereinafter following by reference to the accompanying drawings, in which.

Figure 1:
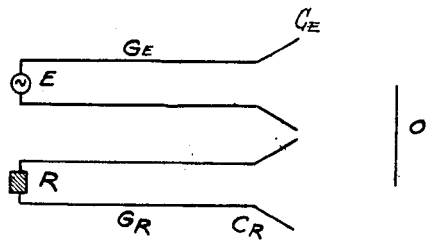
Figure 1 is a schematic view used in explaining the theory of this invention.

It is known that the detection of obstacles by means of decimetric waves is effected normally in the following manner:

A wave generator E (Fig. 1) is modulated into impulses, that is to say, that the power which it radiates is broken up into brief signals or pips. The wave emitted is propagated through a system of guides $G_E$ to the mouthpiece of a transmission horn $C_E$ from whence it radiates into space. The flat wave formed is reflected by the obstacle O to be detected and a fraction of the power is picked up by a receiving horn $C_R$, which by means of a system of guides $G_R$ conducts the power of the return wave to a receiver R. The oscillograph connected to the receiver R then registers two signals due respectively to the direct emission and to the echo, and the interval of time separating these two registrations measures the distance of the obstacle from the horns. The precision of the direction of the azimuth of the obstacle is larger as the width of aperture of the horns is increased. Thus, there is an inducement to use horns of large dimensions which are heavy and inconvenient.

Figure 2:
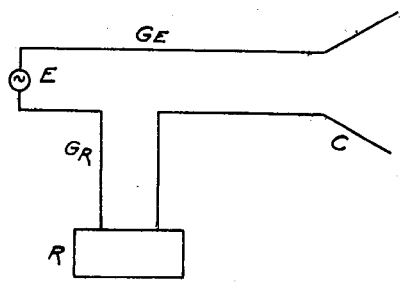
Fig. 2 is a schematic view showing the manner of associating the transmitting and receiving wave guides according to this invention.
Figure 3:
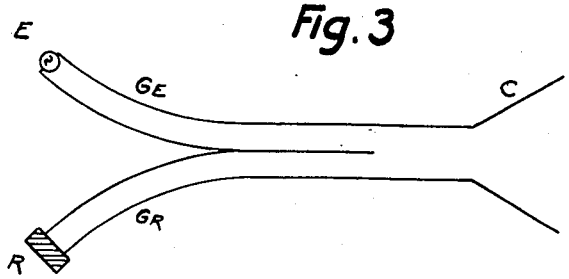
Fig. 3 illustrates a modified method of associating a transmitting and receiving wave guide in accordance with this invention.
Figure 4:
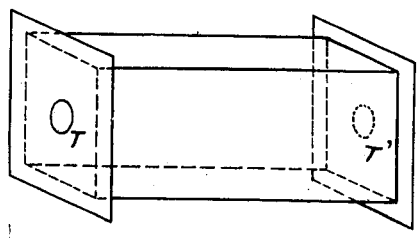
Fig. 4 is a perspective view illustrating one form of resonator adapted to be associated with the wave guides of this invention.
Figure 5:
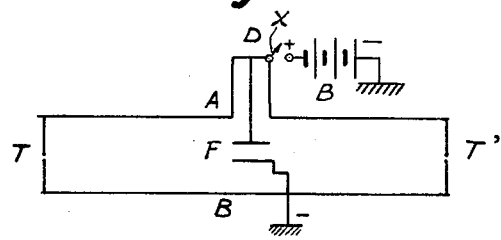
Fig. 5 is a schematic view illustrating the manner of introducing the adjustable capacity in the wave guide in accordance with this invention.
Figure 6:
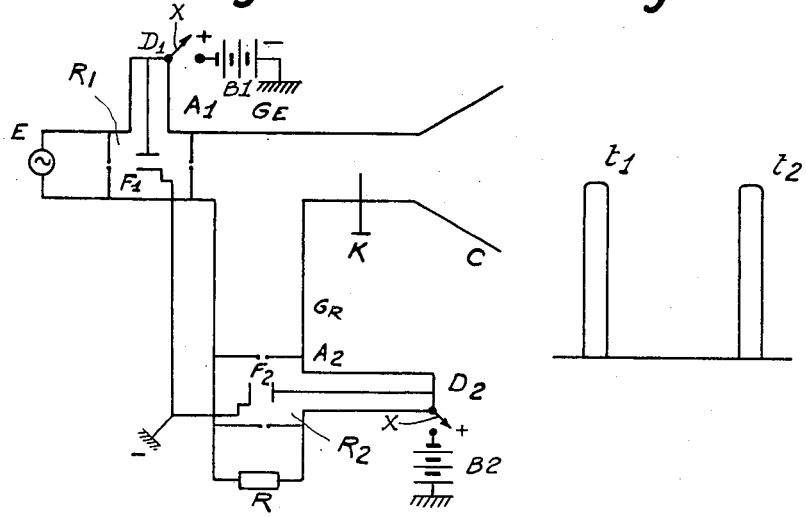
Fig. 6 illustrates a modified form of transmitting and receiving system equipped with resonators and the variable capacity means in accordance with this invention.
Figure 7:
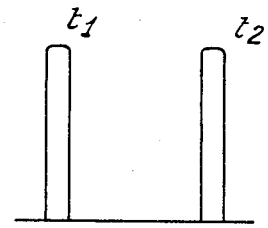
Fig. 7 is an oscillograph record showing characteristic curves of the operation of the system of my invention.

The present invention has for its object to reduce the space occupied by the apparatus by only employing a single horn for both transmission and reception and supplied by two different guides connected one to the transmitter and the other to the receiver, the junction of the two guides being effected in any manner making due allowance for the position of the various apparatus of the installation, for example, the guide $G_R$ (Fig. 2) supplying the receiver R may be placed in shunt on the lateral face of the guide $G_E$, which connects the transmitter E to the single horn C; the two guides $G_E$ and $G_R$ may be juxtaposed by their lateral faces, so as to produce the arrangement illustrated in Fig. 3.

Whatever may be the form of junction adopted between the two guides, it is necessary to ensure the following two conditions:

1. During the time of transmission of a signal by the transmitter E (Fig. 2 or 3), the wave must be able to circulate freely in the transmitter channel in such manner that the whole of the power is transmitted through the mouthpiece of the horn C; and 2. During the period of reception, the transmitter channel must arrest the wave and only the receiver channel must allow the complete penetration of the reflected wave.

The method according to the present invention which meets the two preceding conditions, consists in the use of resonators suitably associated with the guides and in that placing out of tune can be effected as desired. The explanation hereafter given together with Figs. 4, 5, 6, 7 and 8 of the accompanying drawings, will enable the constitution of these resonators to be understood, as also the manner in which they are used in order to fulfill their purpose. It is clear that the forms and arrangements of the figures are given simply by way of example and that they do not imply any limitation to the principle of the invention.

In accordance with one embodiment of the invention, the resonator associated with the guide consists of a prismatic metallic box (Fig. 4) the rectangular end faces of which are metallic irises placed across the wave guide. On the entry and exit faces there are bored two identical holes T and T' the diameter of which depends upon the quality factor to be obtained. There is introduced between two points A and B located towards the center of the lateral faces of the resonator (Fig. 5), in parallel, a condenser F, the two electrodes of which may be carried as desired up to different continuous potentials as for example by means of battery B connected through switch X as shown; F is, for example, a condenser with instantaneously variable capacity of the kind described in United States Patent application Serial No. 745,323, now abandoned, for a "Condenser the capacity of which can vary with very high frequency, and applications." The capacitor F may also be placed at the end D of the coaxial line coupled with the cavity resonator.

In tuning the total impedance between A and B (Fig. 5) to the frequency of transmission by the adjustment of the concentric line AD and then interposing the resonator thus tuned in one of the portions of the transmitter guide, there will be obtained an almost perfect transmission. If, then, there is established between the electrodes of F a certain direct current the resonator is no longer tuned to the frequency of transmission and the transmission falls to a very low value. It is clear that the concentric line AD can also be regulated in such manner that transmission only takes place when the continuous potential is applied to the terminals of F, and not when this tension is suppressed.

In accordance with a first modification of the invention, there will be arranged two such resonators in series, the one $R_1$ in the transmitter guide $G_E$ (Fig. 6) and the other $R_2$ in the receiver guide $G_R$. It will then be so arranged by means of a continuous potential applied to the electrodes of the capacities $F_1$ and $F_2$ by sources $B_1$ and $B_2$ associated with switches X, connected to the points marked + and —, as to tune or detune the resonators, in order to realize the two previously announced conditions. The concentric line $A_1$ $D_1$ of the resonator $R_1$ must be adjusted in such a way that the cavity resonator is tuned, for example, by impressing upon it the direct potential, which must be established at the same time as the transmission signal. On the contrary, the resonator $R_2$ must be detuned during the transmission of the signal and remain tuned for the whole remaining time. If, in spite of the impressing of a direct voltage on this resonator $R_2$, the field received during the transmission signal by the receiver R is still too great, it is sufficient to place in $G_R$ one or more other resonators of the type $R_2$ until attaining the desired weakening. Finally, a corrector system K placed in front of the junction of the two guides $G_E$ and $G_R$ causes the reflected wave to penetrate in its entirety into the receiver guide $G_R$ the transmitter guide $G_E$ then being plugged up. Corrector system K may comprise an adjustment screw and plate adjustable from the exterior of the wall of the main guide between the reception guide and the trumpet.

Under the above conditions, the oscillograph of the receiver registers successive signals $t_1, t_2 \ldots$ (Fig. 7), the interval of time separating the attenuated transmission pulse from the received pulse giving the measure of the distance of the horn from the obstacle. The method furthermore obviates the disturbance which local obstacles would introduce. To this end, it is sufficient to set the time during which a direct potential is impressed on the electrodes of $F_1$, in such manner that it slightly exceeds the duration of a transmission signal; the reception resonators then remain still detuned when the reflected wave from the local obstacle returns to the receiver, and consequently the corresponding signal cannot be seen on the oscillograph.

Figure 8:
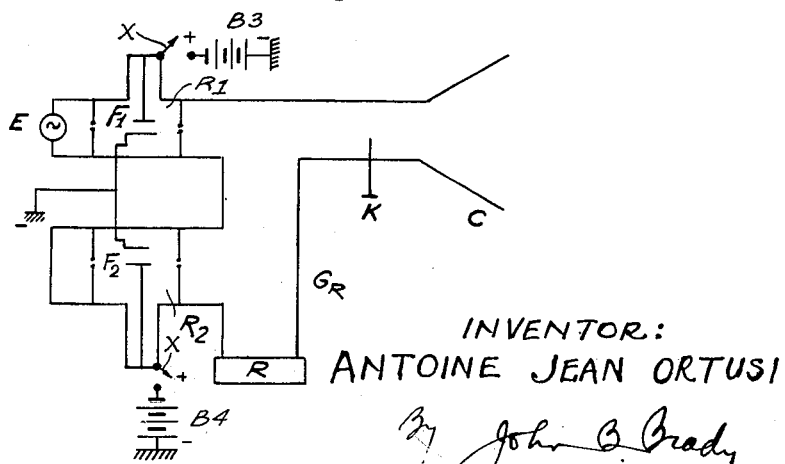
Fig. 8 illustrates a further modified form of transmitting and receiving system embodying my invention.

According to a second modification of the invention, resonators may be used placed in shunt on the guides. Fig. 8 illustrates diagrammatically such an arrangement where one of the resonators is in shunt. The resonators $R_1$ and $R_2$ are identical, and are respectively tuned and/or detuned at the same time by the simultaneous application of a direct potential by sources $B_3$ and $B_4$ associated with switches X, in Fig. 8. But the resonator $R_2$ placed in shunt on the receiver guide $G_R$ blocks the reception during the time of transmission and also during the time of the reception of a wave reflected by a local obstacle; on the contrary, it allows the passage in full of the wave reflected the rest of the time.

While I have described my invention in certain of its preferred embodiments I realize that modifications may be made and I desire that it be understood that no limitations upon my invention are intended other than may be imposed by the scope of the appended claim.

What I claim as my invention and desire to secure by Letter Patent of the United States is:

In an installation for the detection of electromagnetic obstacles including a transmitter and a receiver using a common aerial, the transmitter exciting said aerial for the transmission of pulses of very short waves in the direction of the one or several obstacles to be detected, said receiver operating to record the waves returned to the same aerial after reflection on the said one or several obstacles, in combination, a single feeder connected to said aerial, two distinct channels connecting respectively said transmitter and said receiver to said single feeder, each one of these channels being respectively connected to a resonator which may render it conducting or non-conducting, depending on whether or not said associated resonator is tuned on the frequency of said waves, each resonator including a capacitive element of the type with capacity variable as a function of the direct voltage applied at its terminals, and means for periodically applying direct voltages to said capacitive elements in order to tune and detune said resonators on the frequency of said waves whereby the channel of the transmitter becomes conducting and that of the receiver non-conducting during the duration of the emission of pulses, and the channel of the transmitter remains non-conducting and that of the receiver conducting during the remainder of the time.

ANTOINE JEAN ORTUSI.

REFERENCES CITED

The following references are of record in the file of this patent:

UNITED STATES PATENTS

| Number | Name | Date |
| --- | --- | --- |
| 2,106,770 | Southworth | Feb. 1, 1938 |
| 2,129,711 | Southworth | Sept. 13, 1938 |
| 2,412,315 | Brown | Dec. 10, 1946 |
| 2,408,055 | Fiske | Sept. 24, 1946 |
| 2,415,242 | Hershberger | Feb. 4, 1947 |
| 2,422,190 | Fiske | June 17, 1947 |
| 2,439,656 | Hausz | Apr. 13, 1948 |